United States Patent [19]
Harland

[11] 3,724,278
[45] Apr. 3, 1973

[54] BACKHOE DEPTH GAUGE
[75] Inventor: Philip W. Harland, Perkasie, Pa.
[73] Assignee: Ametek, Inc., New York, N.Y.
[22] Filed: Dec. 16, 1971
[21] Appl. No.: 208,558

[52] U.S. Cl. .........................73/432 HA, 37/DIG. 19
[51] Int. Cl. .............................G01c 5/04, E02f 9/26
[58] Field of Search ..........73/432 HA; 60/54.5, 54.6; 61/72.1; 137/627.5; 37/DIG. 19

[56] References Cited

UNITED STATES PATENTS

| | | | |
|---|---|---|---|
| 2,851,799 | 9/1958 | Meents et al. | 37/DIG. 19 |
| 2,703,985 | 3/1955 | Jackson | 73/432 HA |
| 3,508,585 | 4/1970 | Kurichh | 137/627.5 |
| 1,099,385 | 6/1914 | Linga | 37/94 |
| 1,369,235 | 2/1921 | Funk | 37/DIG. 19 |
| 2,230,280 | 2/1941 | Yeatman | 73/151 |

FOREIGN PATENTS OR APPLICATIONS 247,116  11/1960  Australia ........................73/432 HA

*Primary Examiner*—Louis R. Prince
*Assistant Examiner*—Daniel M. Yasich
*Attorney*—Smythe & Moore

[57] ABSTRACT

A backhoe has a transmitter on its dipper connected by a flexible, fluid-filled tube to a pressure sensitive gauge mounted at some reference point on the backhoe to define a closed hydraulic system for measuring differences in elevation between the reference point on the backhoe and the dipper. A valve having an axially movable normally closed valve stem is positioned between the tube and the gauge. A pivotally mounted lever has one end engageable with the valve stem and the other end is actuable by the operator of the backhoe to selectively open the connection between the gauge and the tube when a reading on the gauge is desired of the difference of elevation.

5 Claims, 6 Drawing Figures

PATENTED APR 3 1973

INVENTOR
PHILIP W. HARLAND
BY Smythe & Moore
ATTORNEYS

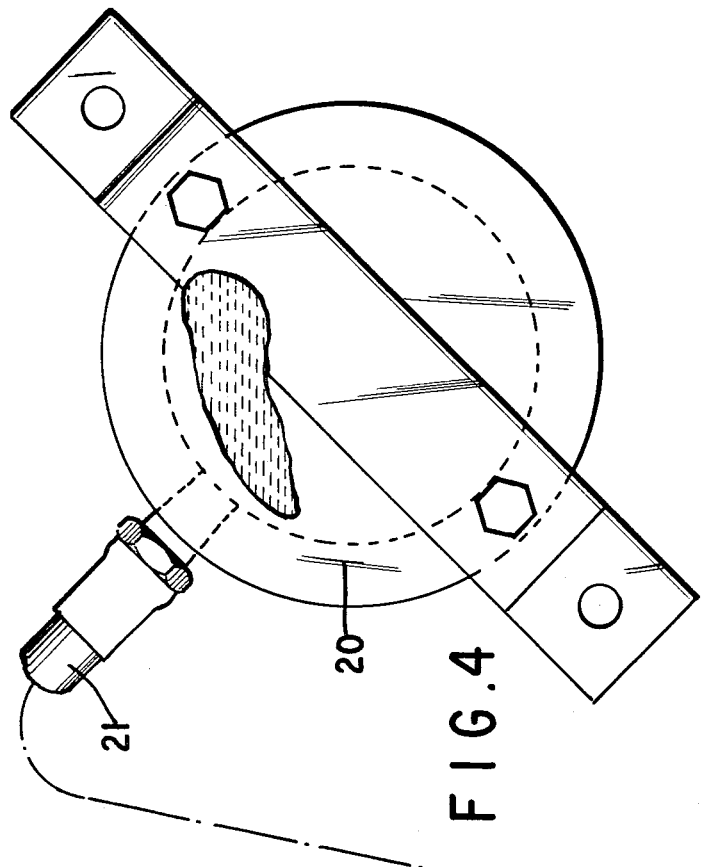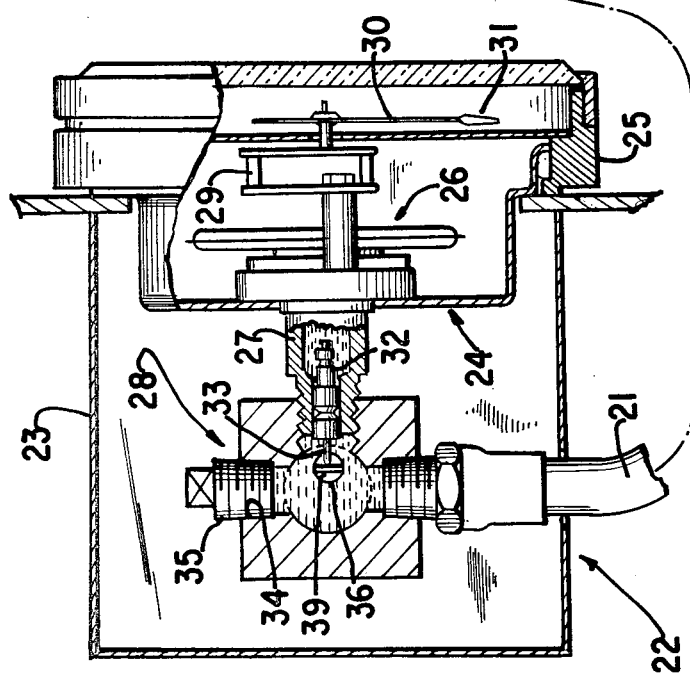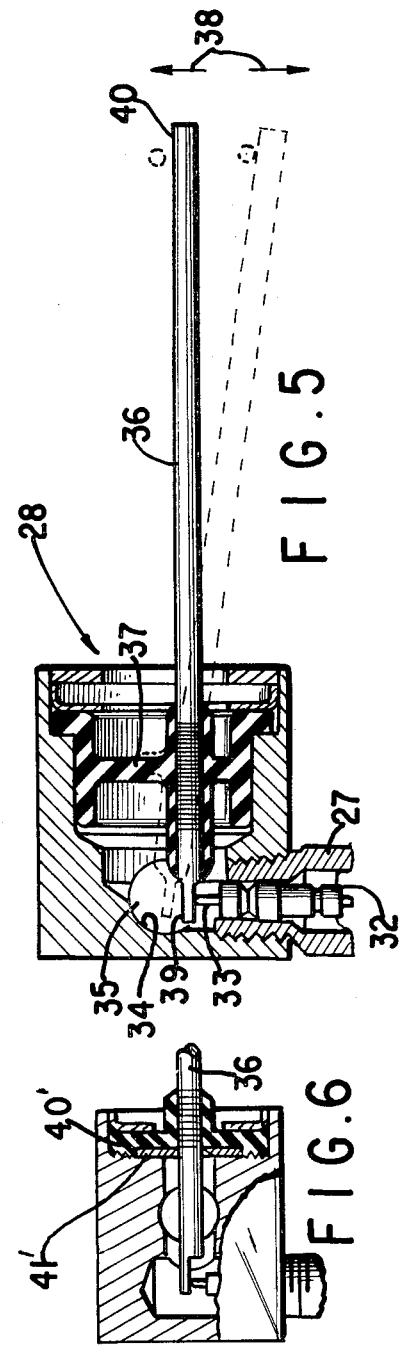

BACKHOE DEPTH GAUGE

The present invention relates to a backhoe depth gauge, and particularly to the valve arrangement between the pressure sensitive gauge on the backhoe and the fluid-filled tube leading to the transmitter on the dipper.

In the operation of the backhoe of the type having a dipper on the end of an adjustable boom, it is important that the operator of the backhoe be able to ascertain quickly and accurately the level of the dipper. In most excavation operations, the dipper can not be seen by the operator who must rely on instruments to ascertain the depth at which the dipper is operating. The level of the dipper is important in checking the depth of an excavation so that the depth thereof can be maintained uniformly at a predetermined level and also to indicate to the operator when the dipper is approaching its maximum depth. Various systems have been proposed for indicating the level of the dipper. Generally, these systems comprise a closed hydraulic system which indicates the difference in levels between the dipper and a reference point from which the depth of the excavation is to be measured. Such a system may include a transmitter connected by a fluid-filled hose to an indicating head which may have a zero adjustable dial for the purpose of establishing the reference point. The transmitter is mounted on the dipper and the indicating head mounted near the controls where it can be read by the operator. When the transmitter is placed at a lower level than the indicating head, the weight of the fluid, which is supported by atmospheric pressure, drops the pressure below atmospheric pressure which creates a vacuum within the sensor in the head.

While such level difference systems have been generally satisfactory in operations, they have had the disadvantage that the indicating head continuously sensed the depth of the dipper. This meant that all movements of the dipper were transmitted to the indicating head and the resulting continuous readings produced a rapid wearing out of the indicator system. Thus, after a relatively short period of time, the readings became inaccurate. It was then proposed to isolate the indicator head from the transmitter so that readings could be obtained only when desired by the operator. Such isolating means generally comprised some form of a valve. Common globe or gate type valves are not sufficiently leak tight and have the disadvantage of affecting significantly the volume of the sensor and inaccurate results in readings were obtained.

One of the objects of the present invention is to provide an improved backhoe depth indicator.

Another of the objects of the invention is to provide an improved valve arrangement on a backhoe depth indicator for isolating the indicator head from the transmitter.

Another of the objects is to provide a simple and effective valve arrangement for isolating a pressure sensitive indicator gauge from the transmitter of a backhoe depth indicator wherein the opening of the valve produces only a negligible change in the volume of the indicating head.

According to one aspect of the present invention, a backhoe has a dipper which is movable over a range of depths. The depth gauge comprises a transmitter mounted on the dipper connected by a flexible fluid-filled tube to a pressure sensitive gauge mounted at some reference point on the backhoe to define a closed hydraulic system for measuring differences in elevation between the reference point and the dipper. There are also provided means between the tube and the pressure sensitive gauge for closing the connection between the tube and the gauge and for selectively opening this connection. The opening and closing means may comprise a valve having an axially movable valve stem and spring means urging the valve stem into closed position. The valve has a stem passing through the body with the seat being on the end of the valve body substantially perpendicular to the axis. Such a valve is of the type referred to as a "tire valve." Manually operable means are operatively connected to the valve stem for depressing the valve stem to open the connection between the transmitter and the pressure sensitive gauge whereby a reading can be obtained on the depth gauge indicating the difference in elevation between the backhoe and the dipper.

The valve stem may be actuated by means of a pivotally mounted lever which has one end engaging the valve stem with its other end being actuable by the operator of the backhoe.

These and other objects, advantages and features of the invention will become apparent from the following description and drawings which are merely exemplary.

In the drawings:

FIG. 4 is a sectional view taken along the line 4—4 of FIG. 2 and a schematic indication showing the connection of the gauge to the transmitter;

FIG. 5 is a sectional view taken along the line 5—5 of FIG. 3; and

FIG. 6 is a fragmentary sectional view of an alternative type holding element such as seen in FIG. 5.

Proceeding next to the drawings wherein like reference symbols indicate the same parts throughout the various views, a specific embodiment of the present invention will be described in detail.

Figure 1:
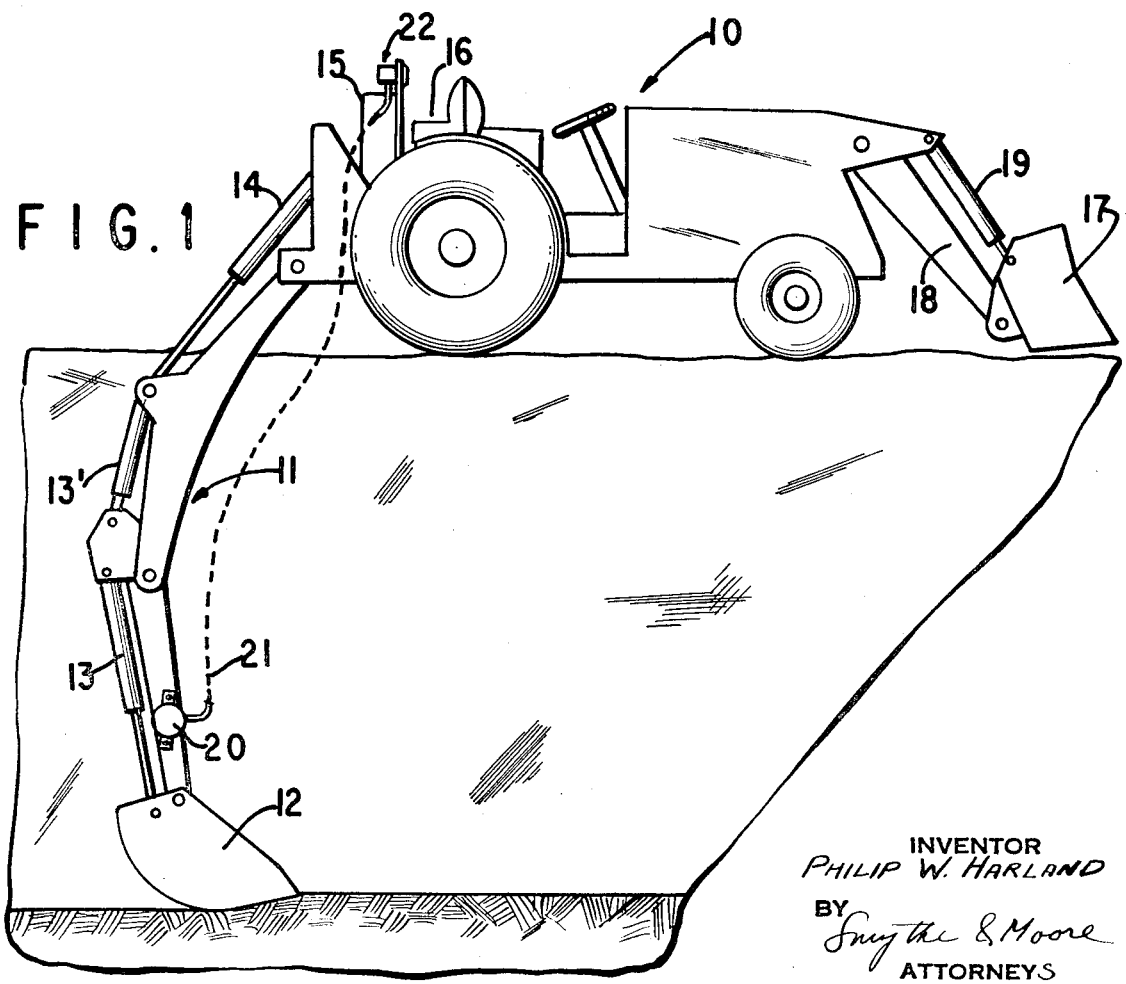
FIG. 1 is a side elevational view of one type of backhoe incorporating a depth gauge indicator according to the present invention.

In FIG. 1, there is indicated generally a backhoe 10 incorporating the depth indicator arrangement according to the present invention. The backhoe 10 comprises a movable articulated boom 11 having at the end thereof a dipper or bucket 12 with the bucket and boom being actuated by hydraulic motors 13 and 14. The controls for the hydraulic motors are mounted in a control stand 15 in front of a seat 16 occupied by the operator. In accordance with the conventional construction of a backhoe, the forward end of the backhoe may be provided with a dipper or bulldozer blade 17 on the end of a boom 18 and actuated by a hydraulic motor 19.

In order to measure differences in elevation between the backhoe or ground level and the dipper, there is provided a closed hydraulic system which comprises a transmitter 20 mounted adjacent the dipper 12 and connected by a flexible fluid-filled tube 21 connected to an indicating head 22 located in the control stand 15.

The indicating head 22 comprises a casing 23 which encloses a pressure sensitive gauge 24 connected to the fluid-filled line 21 as may be seen in FIG. 4. The gauge comprises a case assembly 25 having therein a diaphragm assembly 26 which communicates with a socket 27 threaded into a valve body and lever assembly 28. A motion transmitting mechanism 29 transmits movements of the diaphragm to a pointer 30 which moves over the face of a dial 31.

Within the socket 27 is a valve body 32 which has an axially movable valve stem 33 in a passage in said valve body. The valve is similar to that of a tire valve such as manufactured by Schrader. The valve is provided with a spring, which is not shown in the drawings, which urges the valve stem outwardly into the position indicated wherein the valve is closed so that the connection between the pressure gauge and the valve body and lever assembly 28 is closed.

The valve body and lever assembly 28 is provided with an opening 34 opposite the connection with the tube 21, and this opening is closed by a removable pipe plug 35 to permit access to the interior of the valve body.

Figures 2, 3:
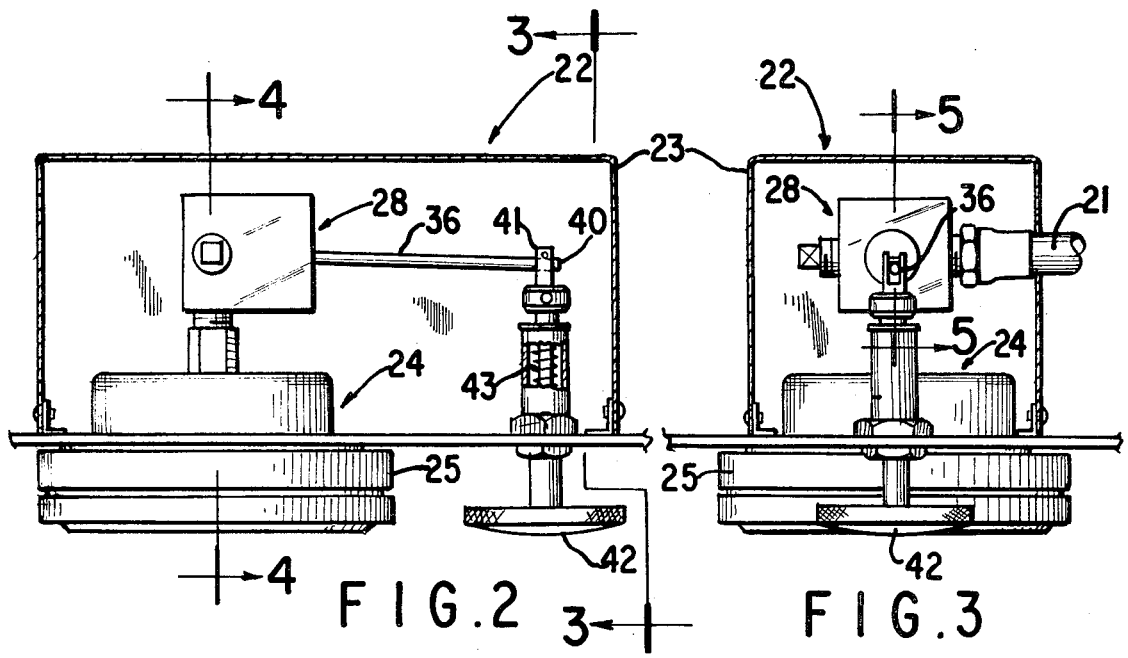
FIG. 2 is a top plan view of the interior of the casing housing, the pressure sensitive indicating gauge with a manually operable button with the casing being shown in section.
FIG. 3 is a sectional view taken along the line 3—3 of FIG. 2.

The valve stem 33 is depressed by means of a lever or operator 36 which is pivotally mounted in a rubber or flexible wall 37 which permits ready pivotal movement of the lever as indicated by the arrows 38 and which will return the lever to its normal position as shown in FIG. 5 when no force is exerted against the lever. One end of the lever indicated at 39 engages the end of the valve stem 33, and the other end of the lever 40' is connected to the end of an axially movable operating rod 41 which extends outwardly of the casing and is provided with a flat manually operable handle 42. A spring 43 maintains the rod 41 in its normal position as shown in FIG. 2. Thus, depression of the handle 42 by the operator will cause the rod 41 to move the lever 40 to the full line position as indicated in FIG. 5, and this movement of the lever will depress the valve stem 33 to open the connection between the pressure gauge and the flexible tube 21.

An alternate arrangement of the support for operator 36 is illustrated in FIG. 6. In this form, a flexible wall 40' is supported by a plate 41'. The operator 36 operates against the valve stem 33 in the same manner as described for FIG. 5.

The above disclosed arrangement thus effectively isolates the pressure sensitive gauge from the transmitter so that no readings will be given by the gauge until the handle 42 is depressed by the operator. Upon depression of the handle 42, opening of the valve 32 will connect the pressure sensitibe gauge to the tube and a reading will be given on the gauge indicating the difference in elevation between the dipper 12 and a previously determined reference point. Since the pressure gauge is preferably provided with a zero adjustable dial, a reference point may be selected either on the backhoe or ground level or at a known level above a desired grade. The use of the valve 32 thus provides a simple and inexpensive structure for obtaining a sealed construction with no stem leak between the tube 21 and the pressure gauge 24. Further, since the valve has a relatively small valve opening, there is a negligible volume change upon opening and closing of the valve. This is an important consideration because any volume change between the valve and the diaphragm will cause the diaphragm to move to accommodate this change in volume. This motion will cause the pointer to move and thus give an error in indication.

It will be understood that various details of construction and arrangement of parts may be changed without departing from the spirit of the invention except as defined in the appended claims.

What is claimed is:

1. In a backhoe depth gauge for a backhoe having a dipper movable over a range of depths, the combination including means comprising a transmitter on said dipper connected by a flexible fluid-filled tube to a pressure sensitive gauge on said backhoe to define a closed hydraulic system for measuring differences in elevation between the backhoe and the dipper, a valve between the fluid-filled tube and said pressure sensitive gauge for closing the connection between said tube and said pressure sensitive gauge and for selectively opening said connection, said valve having a body with a passage therethrough, a movable valve stem in said passage, valve seat means on one end of said body and a valve element on said stem cooperable with said seat, spring means urging said valve stem into closed position relative to said seat, and manually operable means operatively connected to said valve stem for depressing said valve stem to open the connection between the transmitter and pressure sensitive gauge whereby a reading can be obtained on the depth gauge indicating the difference in elevation between the backhoe and the dipper.

2. In a backhoe depth gauge as claimed in claim 1 wherein said manually operable means comprises a pivotally mounted lever with one end engaging said valve stem and the other end being actuable by an operator.

3. In a backhoe depth gauge as claimed in claim 2 and comprising a casing enclosing said pressure sensitive gauge and a depressable button on said casing operatively connected to said other end of said lever.

4. In a backhoe depth gauge as claimed in claim 1 wherein the cross-sectional area of the valve passage is small with respect to the volume of the pressure sensitive gauge so that the effect of the volume of the pressure sensitive gauge upon opening of the valve is negligible.

5. In a backhoe depth gauge as claimed in claim 1 wherein the valve is of the tire valve type.

* * * * *